United States Patent [19]
Newton

[11] 3,753,069
[45] Aug. 14, 1973

[54] START-UP SYSTEM FOR INVERTER DRIVEN MOTOR INCLUDING INVERTER BYPASS CIRCUITRY

[75] Inventor: Alwin B. Newton, York, Pa.

[73] Assignee: Borg-Warner Corporation, Chicago, Ill.

[22] Filed: Nov. 18, 1971

[21] Appl. No.: 199,875

[52] U.S. Cl. ............... 318/440, 318/136, 318/227, 318/242, 318/411, 307/64, 321/11
[51] Int. Cl. ............................................ H02p 1/16
[58] Field of Search .................. 318/227, 398, 242, 318/410, 440, 411, 463, 414, 136; 307/64; 321/11, 14, 2

[56] References Cited
UNITED STATES PATENTS

| | | | |
|---|---|---|---|
| 3,321,688 | 5/1967 | Von Delden | 318/227 |
| 3,555,396 | 1/1971 | Kalman | 318/227 |
| 3,622,862 | 11/1971 | Boksjo | 321/11 |
| 3,321,641 | 5/1967 | Howell | 318/227 UX |
| 3,307,093 | 2/1967 | Wright | 318/227 X |
| 3,319,104 | 5/1967 | Yusuoka et al. | 318/138 |
| 1,966,940 | 7/1934 | Willis | 318/227 |

*Primary Examiner*—G. R. Simmons
*Attorney*—Donald W. Banner et al.

[57] ABSTRACT

An AC electrical motor is normally energized from an inverter which in turn is coupled to a rectifier. An alternator driven from a variable speed source supplies energy to the rectifier. During start-up non-regulated output energy of the alternator is passed directly to the motor until the system approaches operating speed. After start-up, the motor is energized from the inverter at the appropriate normal operating voltage and frequency. The system may be used in a car, where an alternator energizes the motor driving a compressor in the air conditioning system.

5 Claims, 2 Drawing Figures

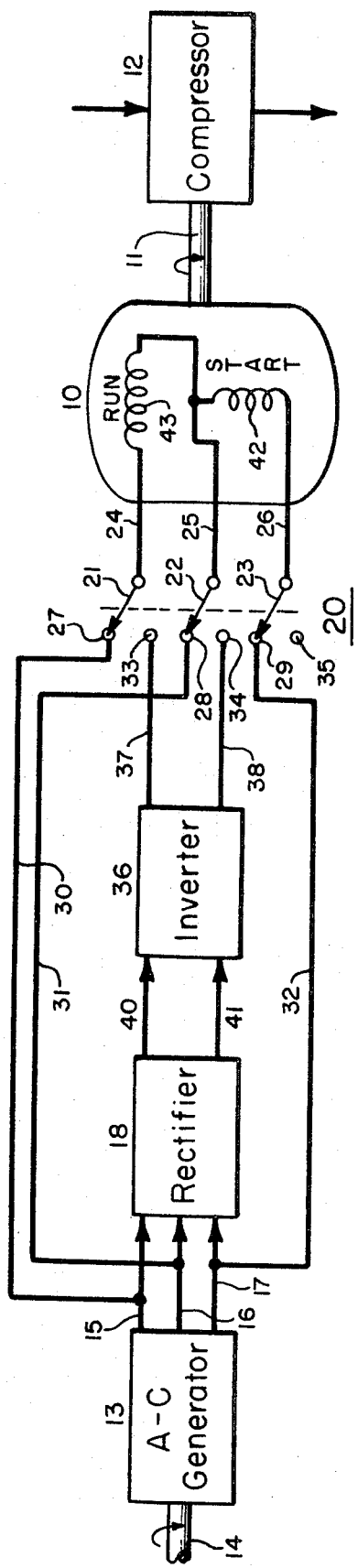
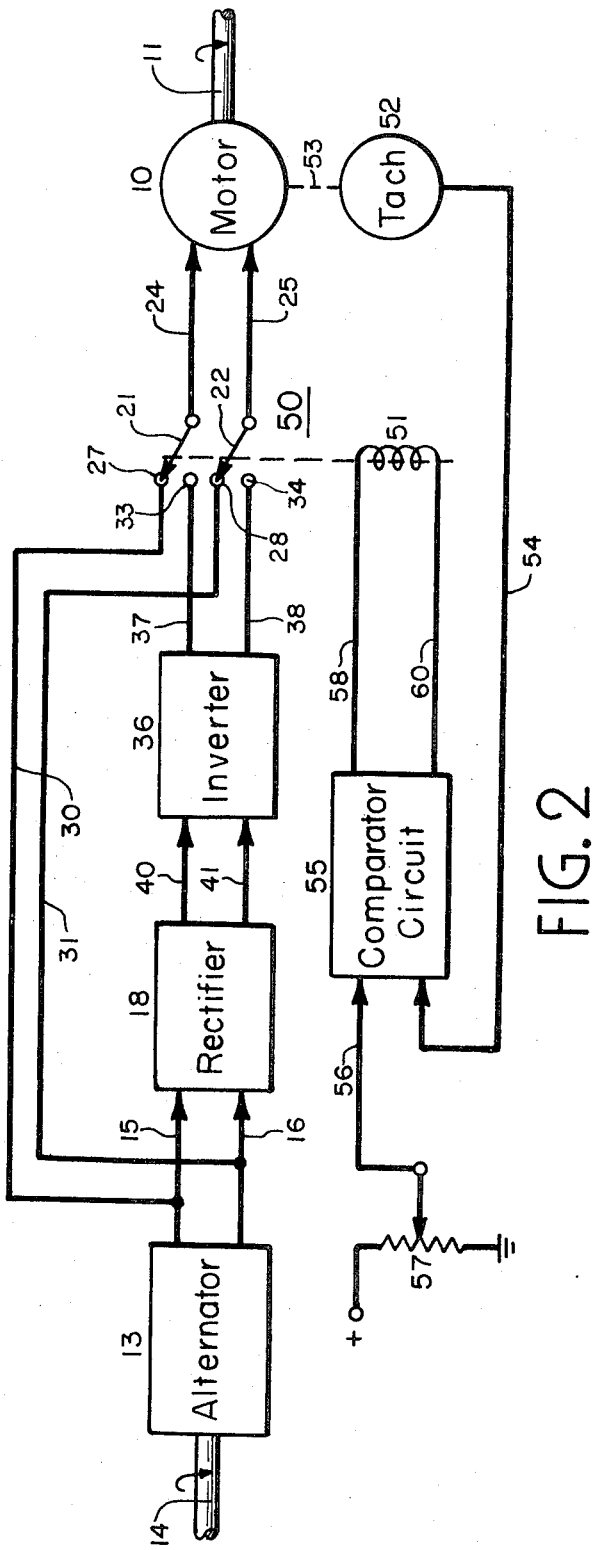

3,753,069

START-UP SYSTEM FOR INVERTER DRIVEN MOTOR INCLUDING INVERTER BYPASS CIRCUITRY

BACKGROUND OF THE INVENTION

Various motor drive systems are now known which employ an inverter to supply AC energy for the motor. Under start-up conditions the motor normally draws a high current, which may be several times the normal running current of the motor, and sometimes as high as 20 times the rated current. This places a requirement on the inverter components, that they be "sized" or electrically rated to handle this high starting current. For example, a silicon-controlled rectifier (SCR) which may be required to handle only 20 amperes at normal load, might have to be sized to handle over 200 amperes to withstand the high transient current at start-up. Various attempts have been made to solve this problem, but they have not been entirely satisfactory to date.

SUMMARY OF THE INVENTION

The present invention is particularly suited for use where a motor is mechanically coupled to a load, such as a compressor or other unit. In certain environments such as an automobile, an AC generator or alternator may be already present to energize the inverter. A rectifier circuit is coupled to the alternator to supply DC energy for the inverter. The input shaft which drives the alternator varies in speed as the automotive engine or other mechanical unit is started from a dead stop.

In accordance with the present invention, a switching means is provided, having a set of movable contacts and first and second sets of fixed contacts. The movable contacts are coupled to the motor. At least some of the fixed contacts in the first set are coupled to the AC generator. The output circuit of the inverter is coupled to at least some of the fixed contacts in the second set. With this system the motor is initially energized over the first contact set from the output of the AC generator as the system is started. Thereafter, the switching means is displaced and the motor is energized over the second fixed contact set from the output energy of the inverter.

DRAWING

In the drawing like reference numerals identify like components, and in the drawing:

FIG. 1 is a block diagram depicting the incorporation of the invention into an automotive air conditioning system; and FIG. 2 is a block diagram depicting another embodiment of the invention.

DETAILED DESCRIPTION OF THE INVENTION

The present invention is particularly useful with automotive air conditioning systems. In general the automobile includes an alternator with a rectifier assembly for providing DC voltage to energize the electrically driven components in the car. The alternator or AC generator is driven from a belt or shaft which varies in speed as the engine of the car is started and driven up to some average operating speed; thus the output voltage of the alternator varies widely during start-up. A car equipped with air conditioning includes a compressor driven by an electrical motor which is normally energized from an electrical circuit within the car. Although the present invention has particular utility in this automotive area, those skilled in the art will appreciate that it is also useful in any system which includes an inverter, in which the generating unit which ultimately supplies energy for the inverter is driven over a wide speed range when the system is started.

FIG. 1 indicates an energizing system for an electrical motor 10 which is connected over a shaft 11 to drive a mechanical load, depicted as a compressor 12. Such a compressor would be connected in a conventional air conditioning system, frequently installed in automobiles today. Electrical energy is supplied from an AC generator 13 driven over a variable input shaft 14 from any suitable mechanical drive arrangement in the car. Frequently this drive is from a pulley or belt which transmits mechanical energy from the drive shaft to other units, such as the fan and the power steering pump. Output energy from generator 13 is supplied over three conductors 15, 16 and 17 to the input side of a rectifier circuit 18. Thus although three-phase energy can be supplied in the illustrated system, the invention is also useful with systems which employ a single-phase generator for supplying energy to the rectifier 18. In many automotive installations the rectifier circuit is physically contained within the same housing that encloses the alternator or generator, so that it appears as a unitary installation.

In accordance with the present invention, switching means 20 is provided. This means may be a mechanical switch as indicated, with movable contacts 21, 22 and 23 coupled over lines 24, 25 and 26 to the windings of motor 10. The switch also includes a first set of fixed contacts 27, 28 and 29, coupled over conductors 30–32 to the conductors 15–17 which carry AC energy from generator 13. Switch 20 also includes a second set of fixed contacts 33, 34 and 35. In this embodiment contact 35 is left blank—that is, no connection is made to it. The output circuit of inverter 36 is coupled over lines 37, 38 to fixed contacts 33, 34 in the second set of contacts. In its turn inverter 36 is supplied with DC energy from rectifier circuit 18 over conductors 40, 41.

Within the housing of motor 10 a start winding 42 is coupled between conductors 25 and 26, and run winding 43 is coupled between conductors 24 and 25. For purposes of explanation it is assumed that both windings 42 and 43 are utilized during system start-up, to provide efficient starting of the motor. As the motor approaches rated speed, it will operate efficiently with only winding 43 energized.

During start-up switch 20 is in the position illustrated, with movable contacts 21–23 engaging the first set of fixed contacts 27–29. As the automobile is started, shaft 14 begins to turn and a "wild" or unregulated frequency AC voltage is produced and passed over output conductors 15–17. This unregulated energy is passed over conductors 30–32, the first set of fixed contacts 27–29, the movable contacts 21–23 of switch 20, and over conductors 24–26 to energize motor 10. In turn motor 10 rotates shaft 11 to drive compressor 12, starting the air conditioning equipment in its cycle. As the automobile approaches rated speed and the output voltage of generator 13 approaches its normal operating frequency, switch 20 is displaced so that the movable contacts 21–23 engage the second set of fixed contacts 33–35. In this switch position the circuit to start winding 42 is interrupted. Run winding 43 however is energized from the output side of inverter 36 over conductors 37, 38, fixed contacts 33, 34, movable contacts 21, 22, and conductors 24, 25. Accordingly motor 10 continues to drive compressor 12 over shaft 11. In this way the maximum efficiency of the unit is realized without subjecting the system to inordinate currents during start-up.

FIG. 2 depicts another embodiment of the invention, in which alternator 13 provides a single-phase energy over lines 15 and 16 to rectifier 18. In addition, the three contact sets of switch unit 20 in FIG. 1 have been replaced by only two sets of contacts. In the showing of FIG. 2, these contact sets are part of a relay 50 which also includes a winding 51. A tachometer 52 is provided as the means for providing an electrical signal varying as a function of the speed of motor 10. The tachometer, or other speed-indicating device, is driven over a shaft depicted by broken line 53. The electrical output signal denoting the speed is applied over line 54 to one input connection of a comparator circuit 55. The other input signal to comparator circuit 55 is derived over line 56 from an adjustable unit 57, depicted as a potentiometer coupled between a plane of positive uni-directional potential and ground. By adjusting the position of the arm or movable tap of potentiometer 57 the level of the reference signal provided on line 56 to the comparator circuit is correspondingly varied. Circuit 55 can be any of a number of well known circuits for providing an output signal on lines 58, 60 whenever the level of the speed-indicating signal provided over line 54 equals the level of the signal provided on line 56. Thus when the speed of motor 10 approaches its normal rated value, the level of the signal on line 54 equals that on line 56, and comparator circuit 55 provides an output signal to energize winding 51 of relay 50. Upon energization the movable contacts 21, 22 are displaced from the position indicated in FIG. 2 to the alternate position to supply the energy from inverter 36 over lines 24, 25 to motor 10. In this way the transition is made smooth and automatic, obviating any need for intervention by the person operating the automobile to effect switch-over from the wild frequency to the normal operation of the system.

While only particular embodiments of the invention have been described and illustrated, it is manifest that various modifications and alterations may be made therein. It is therefore the intention in the appended claims to cover all such modifications and alterations as may fall within the true spirit and scope of the invention.

What is claimed is:

1. A start-up system for an electrical motor connected to drive a mechanical load, comprising an AC generator connected to be driven from an input shaft which varies in speed, switching means having a set of movable contacts coupled to the motor, and having first and second sets of fixed contacts, a rectifier circuit coupled to the AC generator for providing a DC voltage, means for coupling at least some of the fixed contacts in the first set to the AC generator, an inverter connected for energization from the rectifier, which inverter has an output circuit coupled to at least some fixed contacts in the second set so that the motor can be initially energized over the first fixed contact set from the AC generator as the system is started, and thereafter energized over the second fixed contact set to supply the motor from the inverter.

2. An automotive air conditioning system comprising an alternator and a compressor connected to be driven from a motor, including switching means having a set of movable contacts coupled to the motor, and first and second sets of fixed contacts, a rectifier circuit coupled to the output side of the alternator, means for coupling at least some of the first set of fixed contacts to the output side of the alternator, an inverter having its input circuit connected for energization from the output side of the rectifier, which inverter has its output circuit coupled to at least some of the second set of fixed contacts, so that the motor can be initially energized from the output side of the alternator when the system is started, and thereafter the movable contacts can be displaced to engage the second set of fixed contacts and supply the motor from the inverter output voltage.

3. A start-up system in which an electrical motor drives a mechanical load, comprising an alternator driven by an input shaft which varies in speed, a rectifier circuit coupled to the alternator for providing a DC voltage, an inverter connected for energization from the rectifier circuit, a relay including a winding, a set of movable contacts coupled to the electrical motor, a first set of fixed contacts coupled to the output side of the alternator, and a second set of fixed contacts coupled to the output side of the inverter, and circuit means, coupled both to the electrical motor and to the relay winding, for operating the relay and displacing the movable contacts when the speed of the electrical motor approaches rated speed.

4. A start-up system as claimed in claim 3, in which the circuit means includes a tachometer coupled to the electrical motor, a comparator circuit coupled to the relay winding, means for passing an electrical signal from the tachometer to a first input connection of the comparator circuit, and means for passing a reference signal to a second input connection of the comparator circuit, such that the relay is actuated when the speed-indicating signal from the tachometer equals the reference signal supplied to the comparator circuit.

5. A start-up system for an air conditioning unit installed in a car, in which an electrical motor drives a compressor in the unit, an alternator in the car driven by an input shaft which varies in speed, and a rectifier circuit coupled to the alternator for providing a DC voltage, which system includes a inverter connected for energization from the rectifier circuit, a relay including a winding, a set of movable contacts coupled to the electrical motor, a first set of fixed contacts coupled to the output side of the alternator, and a second set of fixed contacts coupled to the output side of the inverter, and a circuit arrangement for operating the relay and displacing the movable contacts when the speed of the electrical motor approaches rated speed, which arrangement includes a tachometer coupled to the electrical motor, a comparator circuit having an output portion coupled to the relay winding, means for passing an electrical signal from the tachometer to a first input connection of the comparator circuit, and means for passing a reference signal to a second input connection of the comparator circuit, such that the relay is actuated when the speed-indicating signal from the tachometer equals the reference signal supplied to the comparator circuit.

* * * * *